United States Patent [19]

Fletcher

[11] 4,104,156

[45] Aug. 1, 1978

[54] DETACHABLE SLING LETDOWN APPARATUS FOR LUMBER SORTER

[76] Inventor: John K. Fletcher, Rte. 8, Box 320, Hot Springs, Ark. 71901

[21] Appl. No.: 805,901

[22] Filed: Jun. 13, 1977

[51] Int. Cl.² ............................................. B65G 47/34
[52] U.S. Cl. .................................................. 209/74 R
[58] Field of Search ................. 209/73, 74 R, 90, 125; 214/6 H, 6 D, 6 DK, 16 B

[56] References Cited

U.S. PATENT DOCUMENTS 3,776,379 12/1973 Harvey .................................. 209/73

Primary Examiner—Allen N. Knowles
Attorney, Agent, or Firm—John R. Walker, III

[57] ABSTRACT

Coupling apparatus for facilitating disengaging sling-like elongated flexible members from the load of lumber pieces being cradled therein. The apparatus includes a pair of hooks which are selectively driven between normal and couple/uncouple positions. A pair of sling-eyes are attached to one of the respective ends of the elongated flexible members and the sling-eyes are adapted for respective cooperative engagement and disengagement with the pair of hooks. Each flexible member passes through a sling-guide which operatively engages the sling-eye or presents it to the hook for recoupling as the flexible member is almost completely taken up by a winch. Subsequently, the hooks are moved to the normal position and the flexible members are sufficiently slackened for reloading.

9 Claims, 10 Drawing Figures

FIG. 5
FIG. 6
FIG. 7
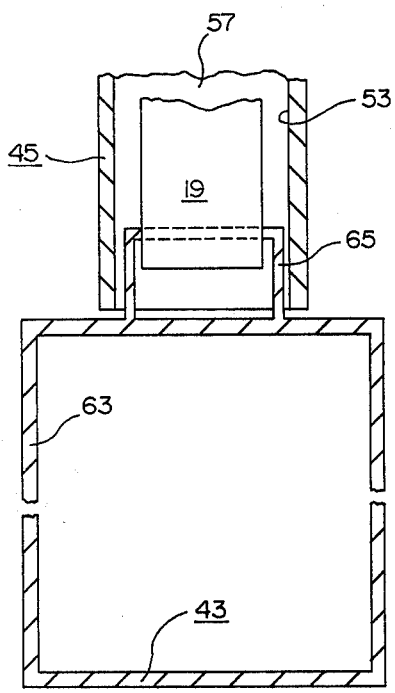
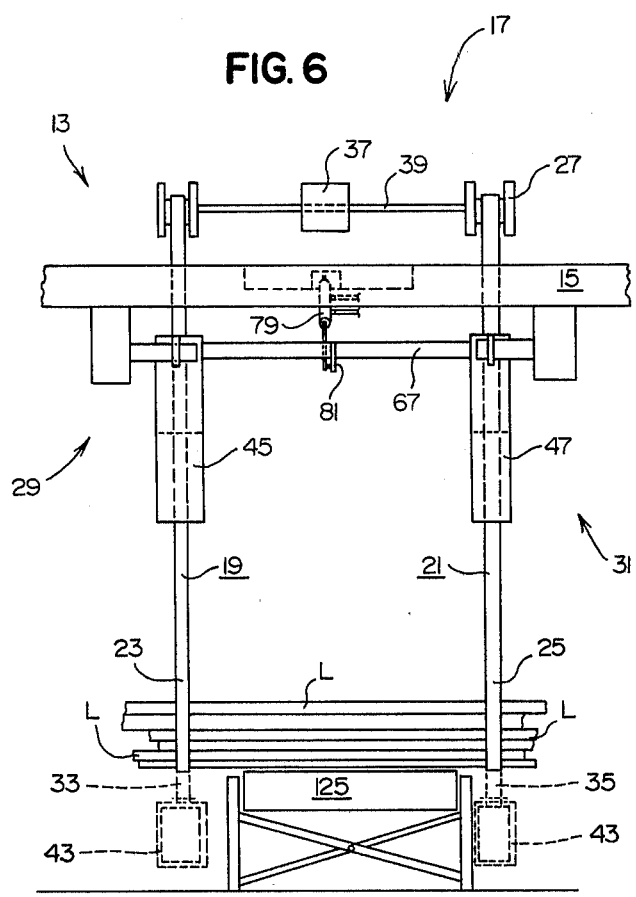
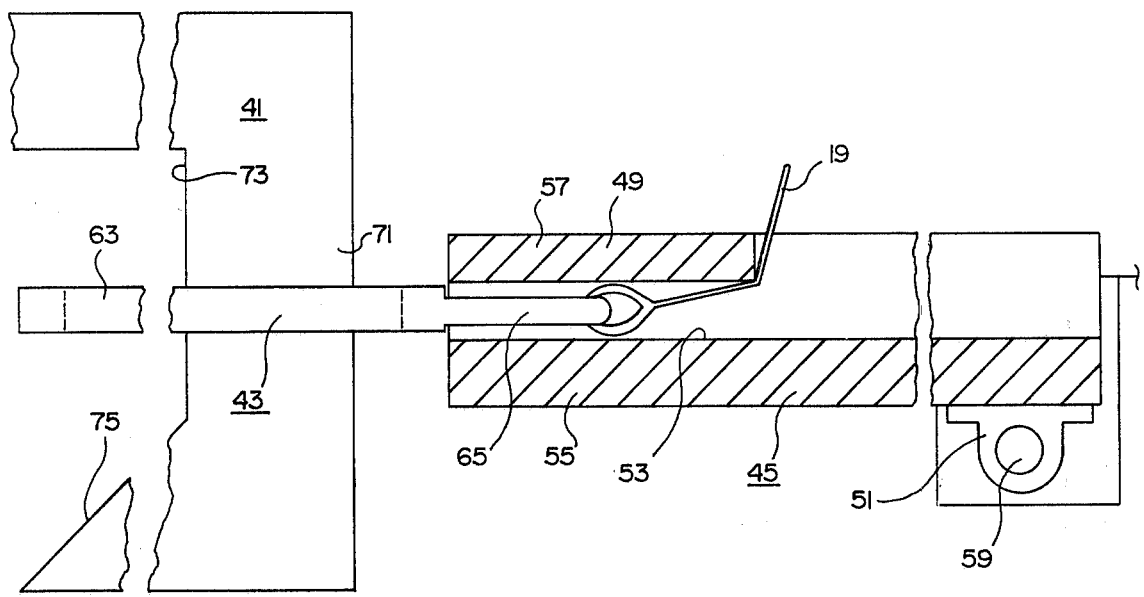

DETACHABLE SLING LETDOWN APPARATUS FOR LUMBER SORTER

BACKGROUND OF THE INVENTION

1. Field of the Invention

This invention relates to the field of lumber sorters and is particularly directed toward the structure for detaching the cradles or letdown slings to facilitate unloading lumber from the cradles.

2. Description of the Prior Art

Letdown apparatus for lumber sorter equipment is relatively new in the lumber art. Applicant's initial entry into lumber sorter letdown apparatus was disclosed in his U.S. Pat. No. 3,578,182, which pertained to a lumber cart having letdown cradles associated therewith. A significant improvement of the 3,578,182 patent was achieved by applicant and fully disclosed in his U.S. Pat. No. 3,776,379 which introduced letdown apparatus attached to or constituting an integral part of the lumber sorter per se.

Applicant is aware of letdown apparatus which incorporates manually operated hook structure for establishing free ends of the straps which support the lumber when unloading the lumber from the cradles.

SUMMARY OF THE INVENTION

The present invention is directed towards overcoming the disadvantages and problems relative to previous letdown apparatus for lumber sorters. The concept of the present invention is to provide coupling apparatus for facilitating disengaging sling-like elongated flexible members (or cradles) from the load of lumber pieces being carried therein. The apparatus includes a pair of hooks which are selectively slingably driven between normal or lumber loading positions and couple/uncouple positions. A pair of sling-eyes are attached to one of the respective ends of the elongated flexible members and the sling-eyes are adapted for respective cooperative engagement with the pair of hooks. Each flexible member is passed through a sling guide which operatively engages the sling-eye, or presents it to the hook, as the flexible member is almost completely taken up by a winch. The sling-like cradles are in a normal operating position when the hook hangs down and supports the sling-eye therein. When the cradle is full of lumber the winch is operated to let down the lumber onto a conveyor assembly. The hooks are then swung to the substantially horizontal position, thus the sling-eyes slip free of the hooks. The winch is operated to take up the elongated flexible members until the sling-eyes engage the sling guides at which time the sling guides are automatically pulled to horizontal positions, thus presenting the sling-eyes to the hooks in preparation for re-establishing the cradles. The elongated flexible members are then paid out sufficiently to establish optimum slack therein for again initially receiving the lumber pieces therein, i.e., in substantially the same manner as disclosed by applicant in his previously mentioned U.S. Pat. No. 3,776,379.

DESCRIPTION OF THE DRAWINGS

FIG. 5 is a sectional view taken as on the line V—V of FIG. 3.

FIG. 6 is an end view of the lumber sorter as depicted in FIG. 2 with the view being taken as from the right-hand side of FIG. 2 with a portion of the couple structure being shown in phantom lines to depict the manner in which the cradles become disengaged from the load of lumber shown restingly supported upon the conveyor structure.

FIG. 7 is an enlarged sectional view of the structure circumscribed by the line VII in FIG. 4.

DESCRIPTION OF THE PREFERRED EMBODIMENT

Figure 1:
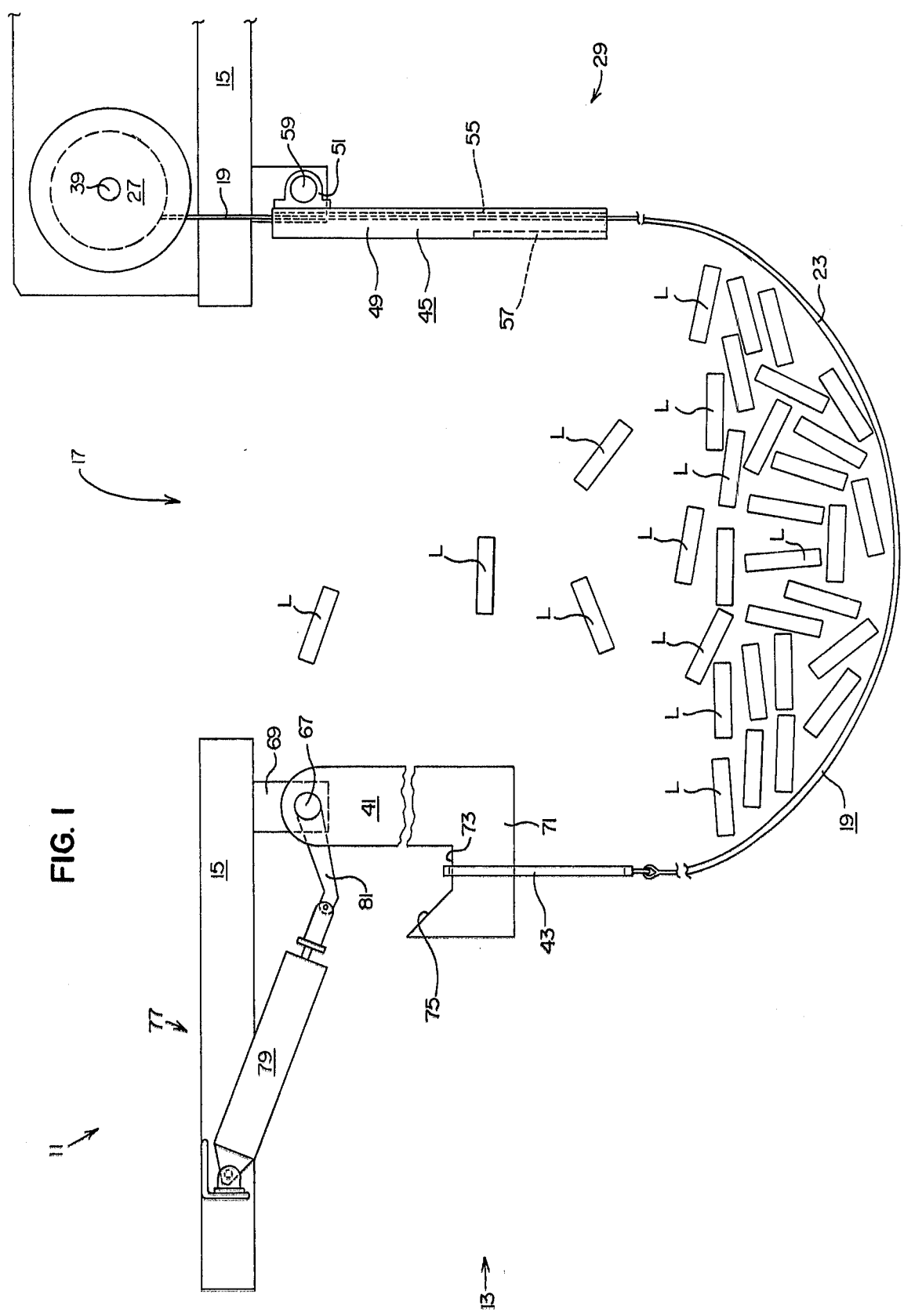
FIG. 1 is a partial elevational view of the lumber sorter of the present invention, showing one of the plurality of bays incorporating elongated flexible members establishing letdown cradles loaded with lumber pieces and having detachable slings in accordance with the present invention and with coupler structure being shown in a normal or lumber loading position.

The detachable sling letdown apparatus 11 of the present invention is intended to be incorporated with a lumber sorter 13 in a manner as best illustrated in FIGS. 1 through 4 of the drawings. The lumber sorter 13 generally is of the type described in applicant's U.S. Pat. No. 3,776,379 issued Dec. 4, 1973. While a brief description of the lumber sorter 13 will suffice for present purposes, reference should be made to the 3,776,379 patent for a more detailed description of the character and structure of letdown type lumber sorters.

The lumber sorter 13 is also of the type which has a frame 15 defining a plurality of adjoining bays 17 for receiving pieces of lumber characterized by the letter L, i.e., only one bay 17 is shown in the drawings. Each of the bays 17 is provided with a pair of elongated flexible members 19, 21 establishing cooperative forward and rearward sling-like cradles, 23, 25, which support the lumber pieces L as they are systematically dropped therein, i.e., the forward and rearward sling-like cradles, 23, 25 being shown in FIGS. 6 and 8 of the drawings. It will be understood that more than two sling-like cradles may be provided for each bay without departing from the spirit and scope of the present invention. The lumber sorter 13 also includes means, e.g., electrically driven winch means 27 or the like, for selectively controlling the height of the forward and rearward cradles 23, 25. From FIGS. 6, 8 and 9 of the drawings it may be seen that the detachable sling letdown apparatus 11 of the present invention includes a pair of coupler means 29, 31 for selectively coupling and uncoupling one of the respective ends of the pair of elongated flexible members 23, 25 with the frame means 15 for enabling the dangling ends, as at 33, 35, thereof to readily be established thus facilitating disengagement from the lumber pieces L, i.e., the detached dangling ends 33, 35 are shown in phantom lines in FIG. 6 and also depicted in FIG. 9.

It should be understood that the pair of elongated flexible members are fixedly attached to the winch means 27 for selectively taking up and paying out the elongated flexible members 19, 21 in unison. In other words, each bay 17 preferably includes a separate prime mover, e.g., an electric motor 37 or the like, which either directly or indirectly through suitable reduction gearing or the like rotatably drives a shaft 39 having the elongated flexible members 19, 21 coupled thereto in a manner well known to those skilled in the art or substantially as taught in the previously mentioned 3,776,379 patent.

Figure 2:
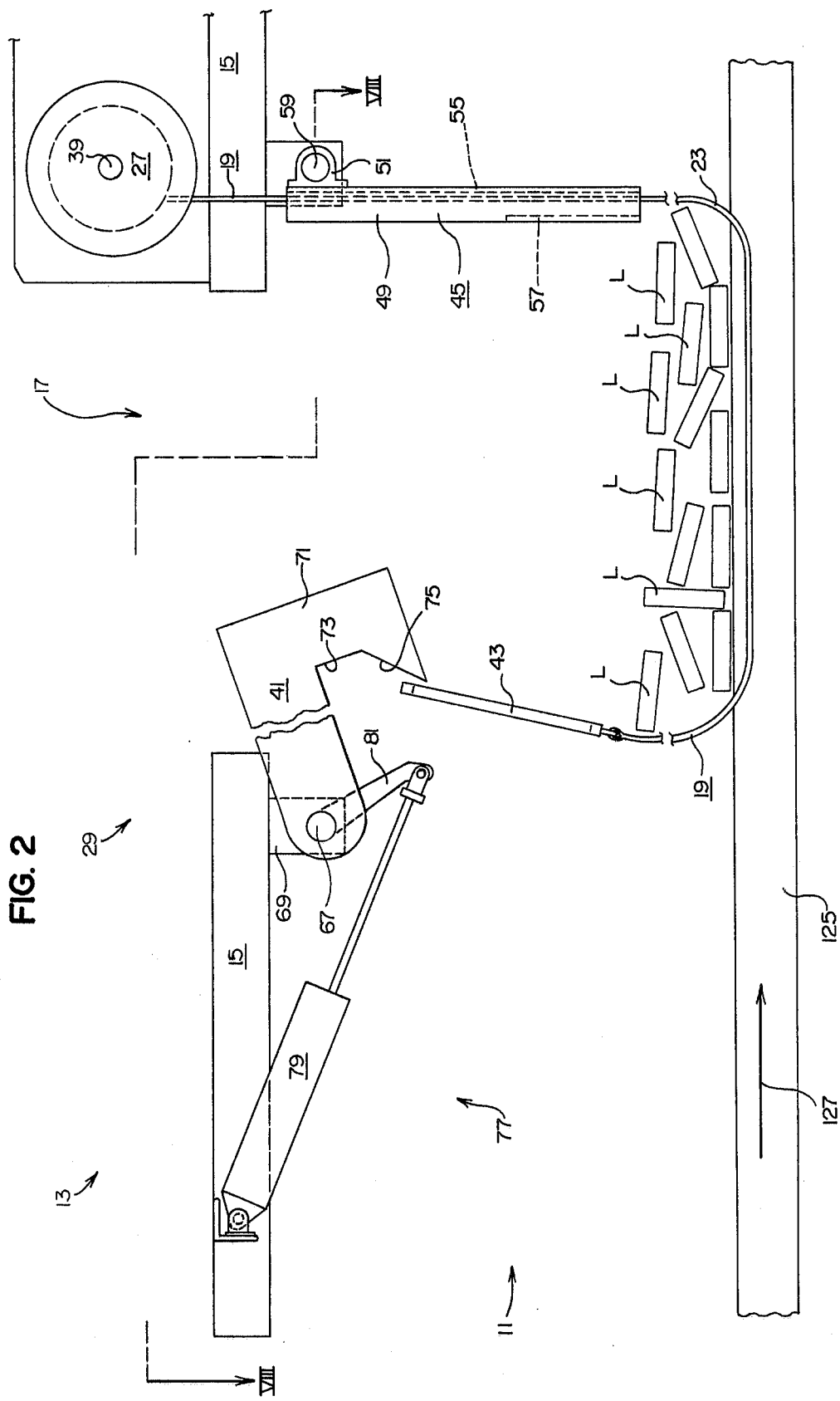
FIG. 2 is a view similar to FIG. 1 with the difference being that the coupler structure is shown in a couple/uncouple position to facilitate releasing the load of lumber onto conveyor structure.
Figure 3:
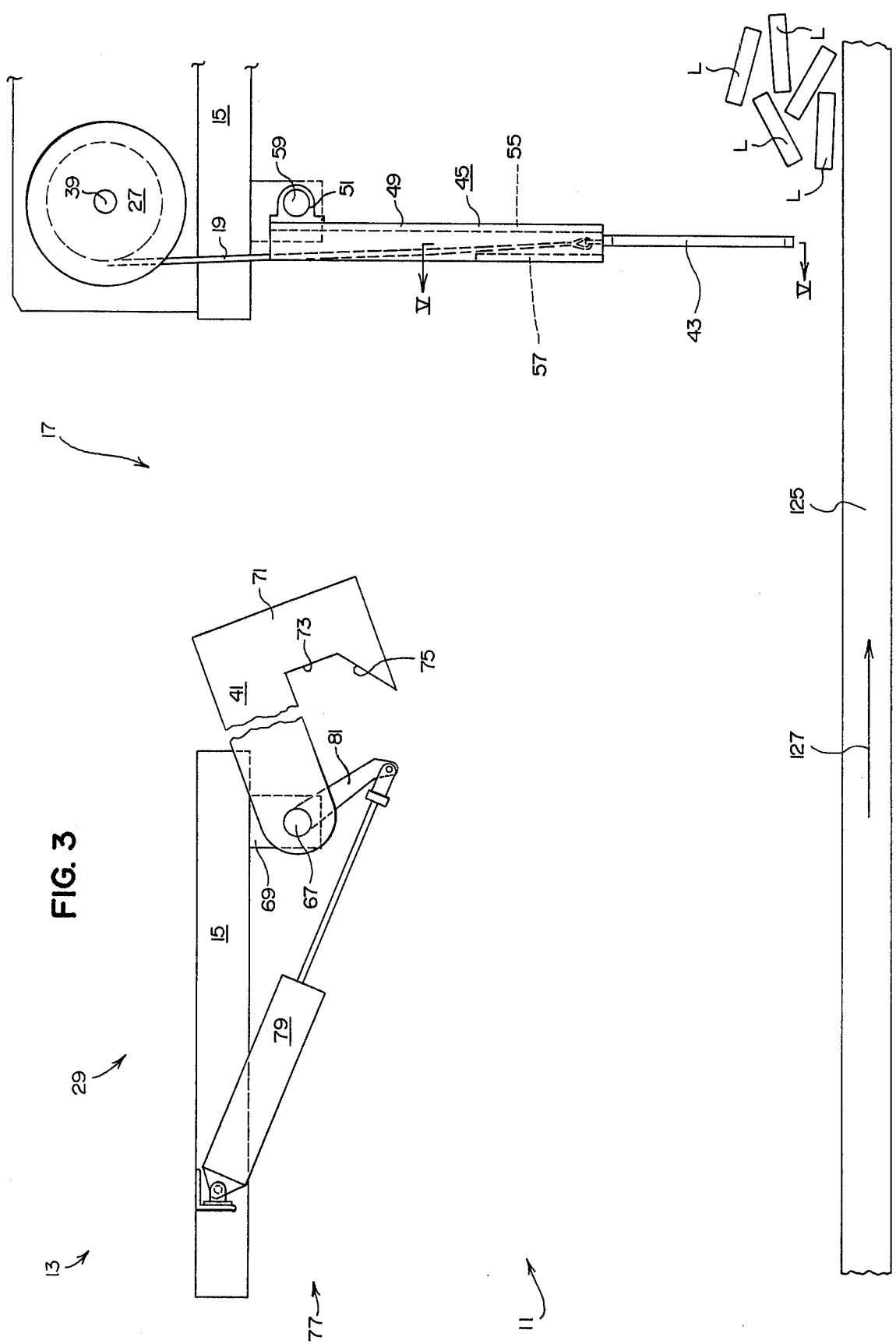
FIG. 3 is a view similar to FIG. 2 depicting the next sequence of operation wherein the elongated flexible members are shown almost completely taken up by winch structure.
Figure 4:
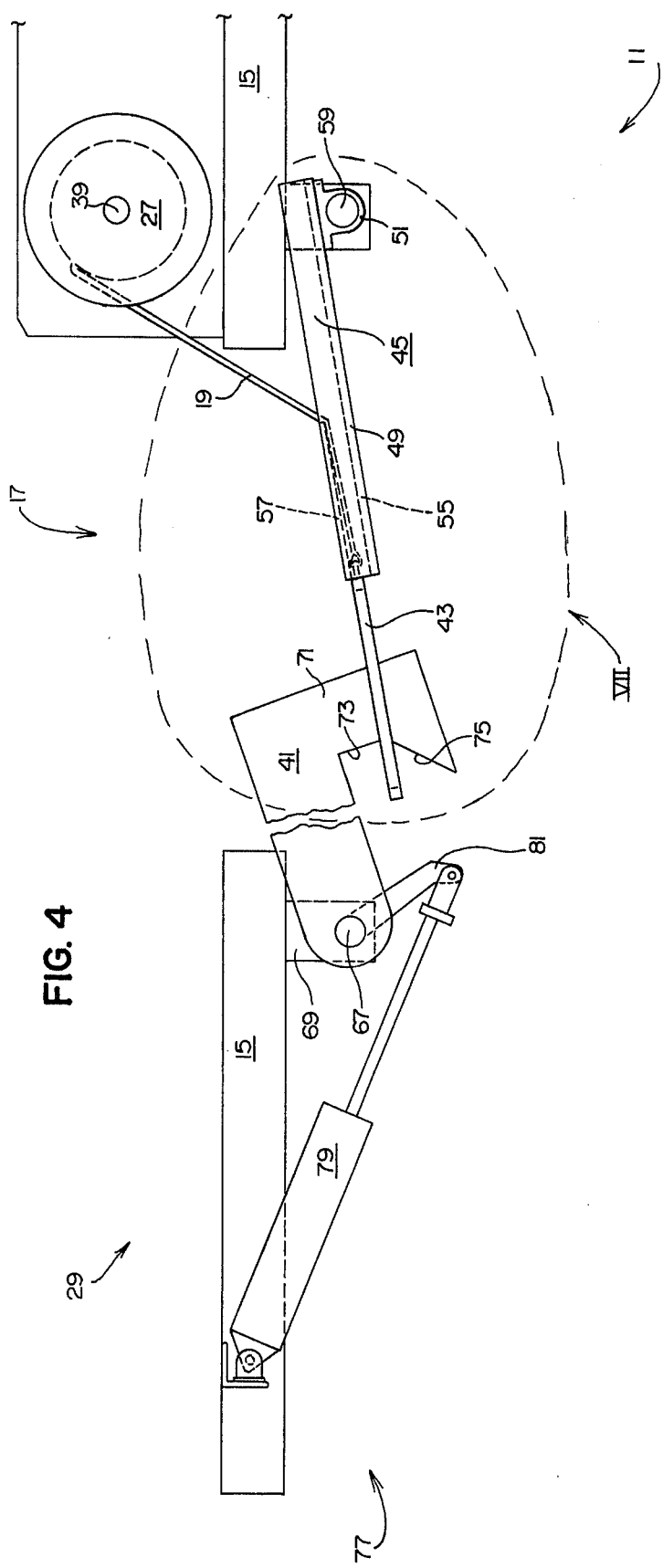
FIG. 4 is a view similar to FIG. 3 depicting the next sequence of operation wherein the elongated flexible members are completely taken up which causes sling guide structure to automatically be pulled to a horizontal position thus a partial recoupling action of the couple structure is automatically achieved immediately prior to establishing the cradles as depicted in FIG. 1.

Each of the coupler means, e.g., the coupler means 29 as shown in FIGS. 1-4 of the drawings, includes hook means 41 swingably attached to the frame means 15 for movement between a normal depending position, as clearly shown in FIG. 1 and a substantially horizontal couple/uncouple position as shown in FIGS. 2-4 of the drawings. Each coupler means 29 also includes sling-eye means 43 attached to the elongated flexible member 19 for cooperative engagement with the hook means 41, i.e., the pair of sling-eye means 43 in essence constitutes the dangling ends 33, 35 as best shown in FIG. 6 of the drawings.

Figure 8:
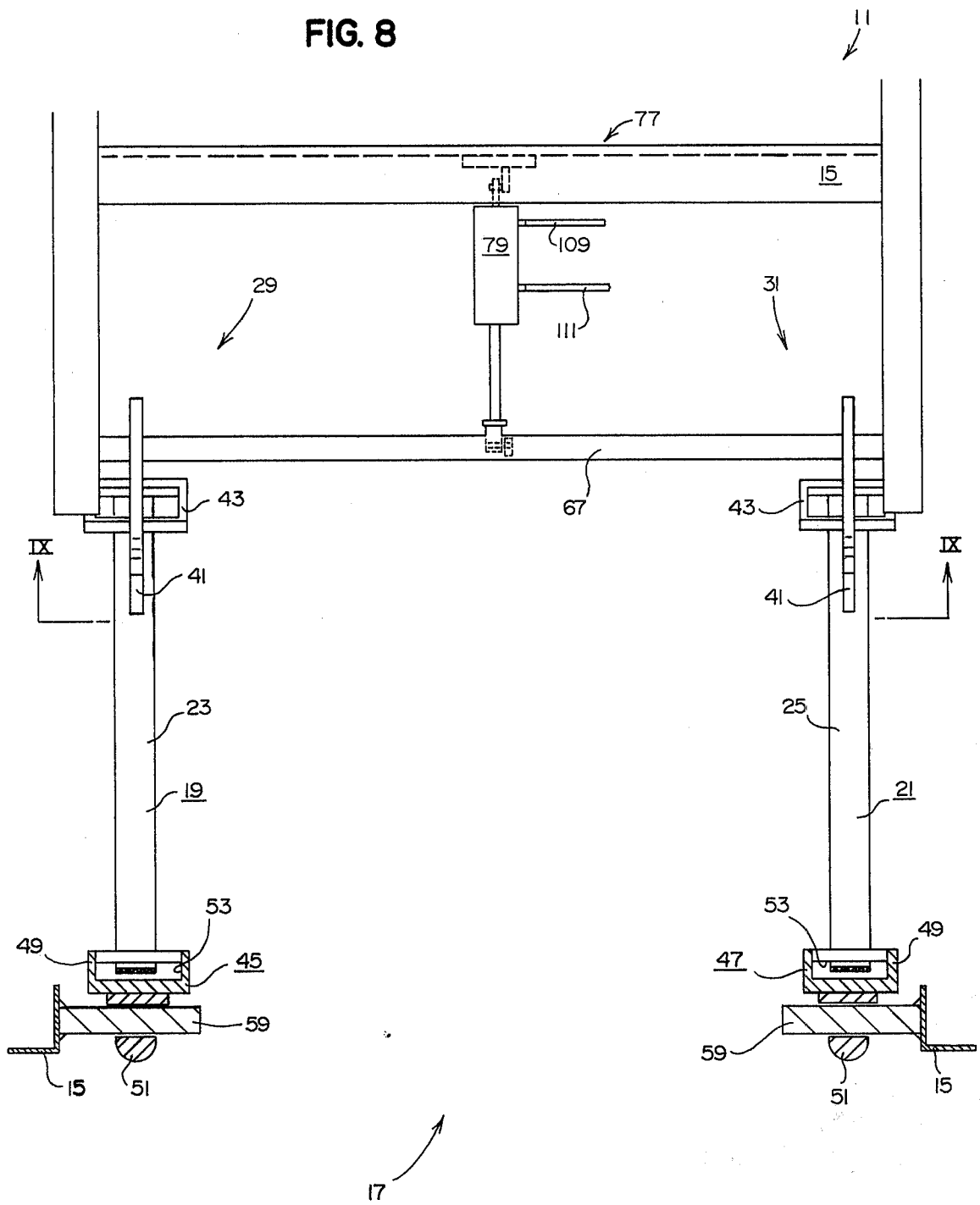
FIG. 8 is a top plan view of the structure as depicted in FIG. 2.

The coupler means 29, 31 respectively include sling guide means 45, 47 which are substantially identical one with the other, as best shown in FIGS. 6 and 8 of the drawings. The sling guide means 45, 47 are swingably attached to the frame means 15 and guidingly constrain the respective elongated flexible members 19, 21 for operatively engaging the sling-eye means 43 as the takeup action of the elongated flexible members 19, 21 near completion or as indicated by the sling guide means 45 clearly shown in FIG. 3 of the drawings. From FIG. 4 of the drawings it may be seen that the sling guide means 45 is urged to swing toward the hook means 41 at a taut condition of the elongated flexible member 19 develops. The sling-eye means 43 is thusly carried with the sling guide means 45 and is presented to the hook means 41 for interlocking engagement of the sling-eye means 43 with the hook means 41, provided, of course, the hook means is in the couple/uncouple position as indicated therein. It should be understood that the sling guide means 47 moves substantially in unison with the sling guide means 45 or both sling-eye means 43 are respectively presented to the pair of hook means 41 simultaneously.

Each of the sling guide means, e.g., the sling guide means 45, includes an elongated boxlike member 49 depending from an externally disposed sleeve-like member 51 which acts like a bearing as clearly shown in FIGS. 1-4 of the drawings. The boxlike member 49 defines a normally substantial vertically disposed channel 53, as best shown in FIG. 8 of the drawings, for readily passing the elongated flexible member 19 therethrough. The channel 53 is defined at least in part by a long wall 55 and a confrontingly arranged relatively short wall 57 spaced from wall 55. The sleeve-like member 51 is disposed adjacent the upper end of the exterior surface of the long wall 55 and is fixedly attached thereto in any well known manner as by welding or the like.

The sleeve like member 51 or bearing establishes in part pivot means 59 which pivotally attaches the boxlike member 49 to the frame means 15 for pivotal movement of the boxlike member 49 about a horizontal axis.

From FIGS. 1-4 it may also be seen that the winch means 27 and the pivot means 59 are arranged with respect to one another to cause an angular non-straight pull on the boxlike member 49 and the sling-eye means 43 comes into engagement with the boxlike member 49. From FIGS. 7 of the drawings it may clearly be seen that the angular non-straight pull on the boxlike member 49 is toward the relatively short wall 57 thus enabling the elongated flexible member 19 to engage and pass upwardly across the end of the relatively short wall 57 as the boxlike member 49 swings upwardly about the horizontal axis of the pivot means 59 or moves to a position as clearly shown in FIG. 4 of the drawings.

From FIG. 5 of the drawings it may be seen that the sling-eye means 43 includes a ring-like member 63 having a clevis member 65 fixedly attached thereto as by welding or the like, i.e., the ring-like member 63 and the clevis member 65 preferably are formed from steel or the like. The flexible elongated member 19 is suitably attached to the clevis member 65 in any well known manner so as to suitably support the weight of a load of lumber pieces L. The size of the clevis member 65 is such that it may be received within the channel 53 as clearly shown in FIG. 5 of the drawings with sling-eye means 43 abuttingly engaging the lower end of the boxlike member 49 as best shown in FIGS. 3, 4 and 7 of the drawings.

Figure 9:
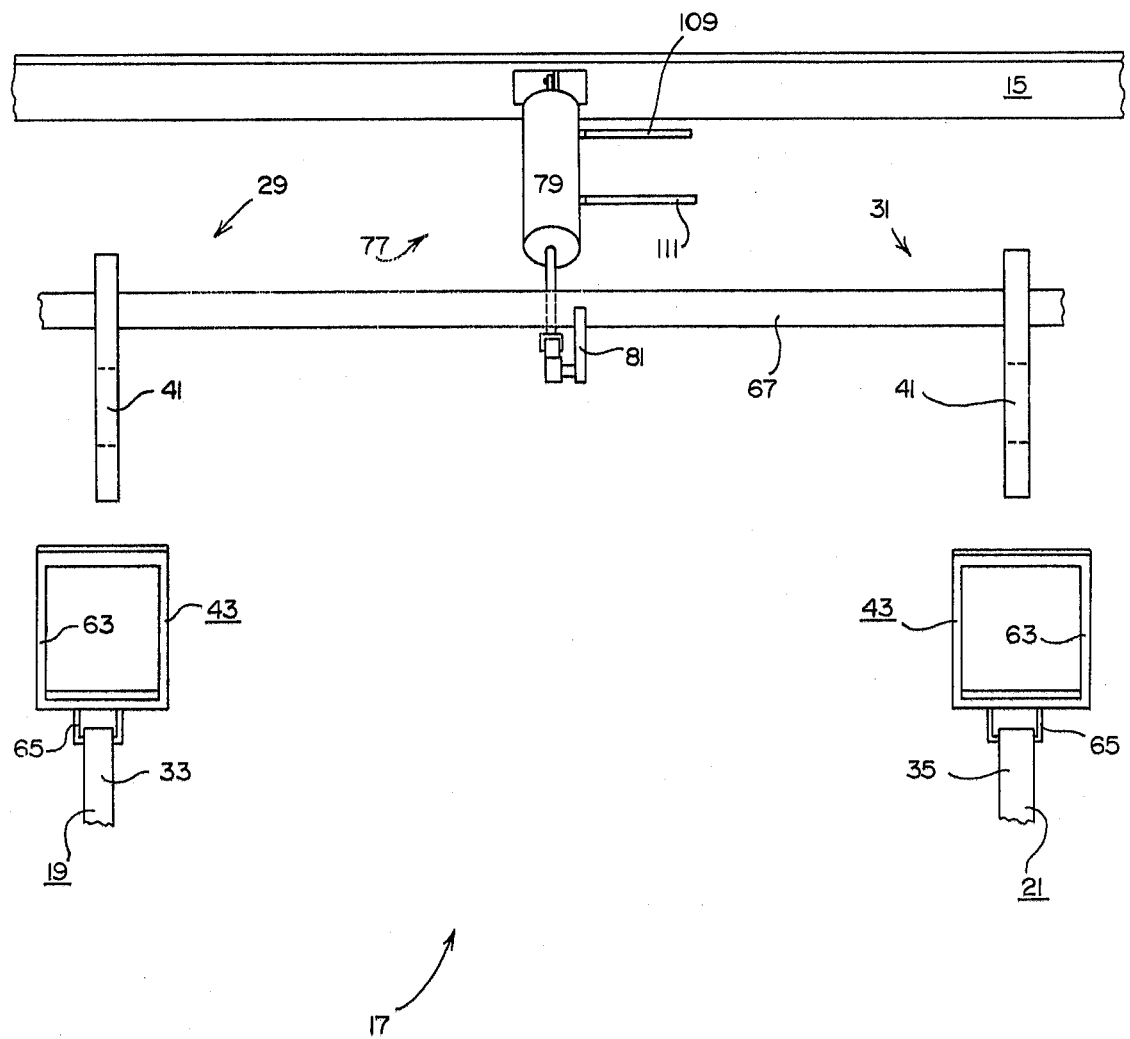
FIG. 9 is a sectional view taken as on the line IX—IX of FIG. 8.

From FIGS. 8 and 9 of the drawings it may be seen that both of the pair of hook means 41 are moved in unison by a horizontally disposed rod 67. The pair of hook means 41 are disposed at either end of the rod 67 and fixedly attached in any well known manner as by welding or the like. From FIGS. 1-4 of the drawings it may be seen that the rod 67 is pivotally attached to the frame 15 or to lugs 69 or the like, thus the pivotal movement of the horizontal rod 67 causes the pair of hook means 41 to move between the normal depending position as shown in FIG. 1 and the substantially horizontal couple/uncouple position as shown in FIGS. 2-4 of the drawings.

Each of the hook means 41 includes a distal portion 71 defining gullet means 73 for restingly supporting the sling-eye means 43 when the hook means is in the normal depending position as shown in FIG. 1 of the drawings. Additionally, each of the hook means 41 preferably includes camlike means 75 for lockably receiving the sling-eye means 43 within the gullet means 73 when the hook means 41 is in the normal position (FIG. 1) and for providing means for readily enabling the sling-eye means 43 to slidably gravitate free from the hook means 41 as the hook means 41 is moved to the couple/uncouple position, i.e., as clearly shown in FIG. 2 of the drawings.

The detachable sling letdown apparatus 11 preferably includes means, e.g., pneumatic actuator means 77 or the like, for remotely moving the hook means 41 between the normal depending position (FIG. 1) and the couple/uncouple position (FIGS. 2-4).

The pneumatic actuator means 77 preferably includes a double acting pneumatic cylinder 79 coupled to the horizontal rod 67 through lever means 81 or the like in any manner well known to those skilled in the art. Accordingly, the fractional rotation of the rod 67 is achieved by the pneumatic actuator means 77 in moving the hook means 41 between the normal position (FIG. 1) and the couple/uncouple position as shown in FIGS. 2-4 of the drawings.

Figure 10:
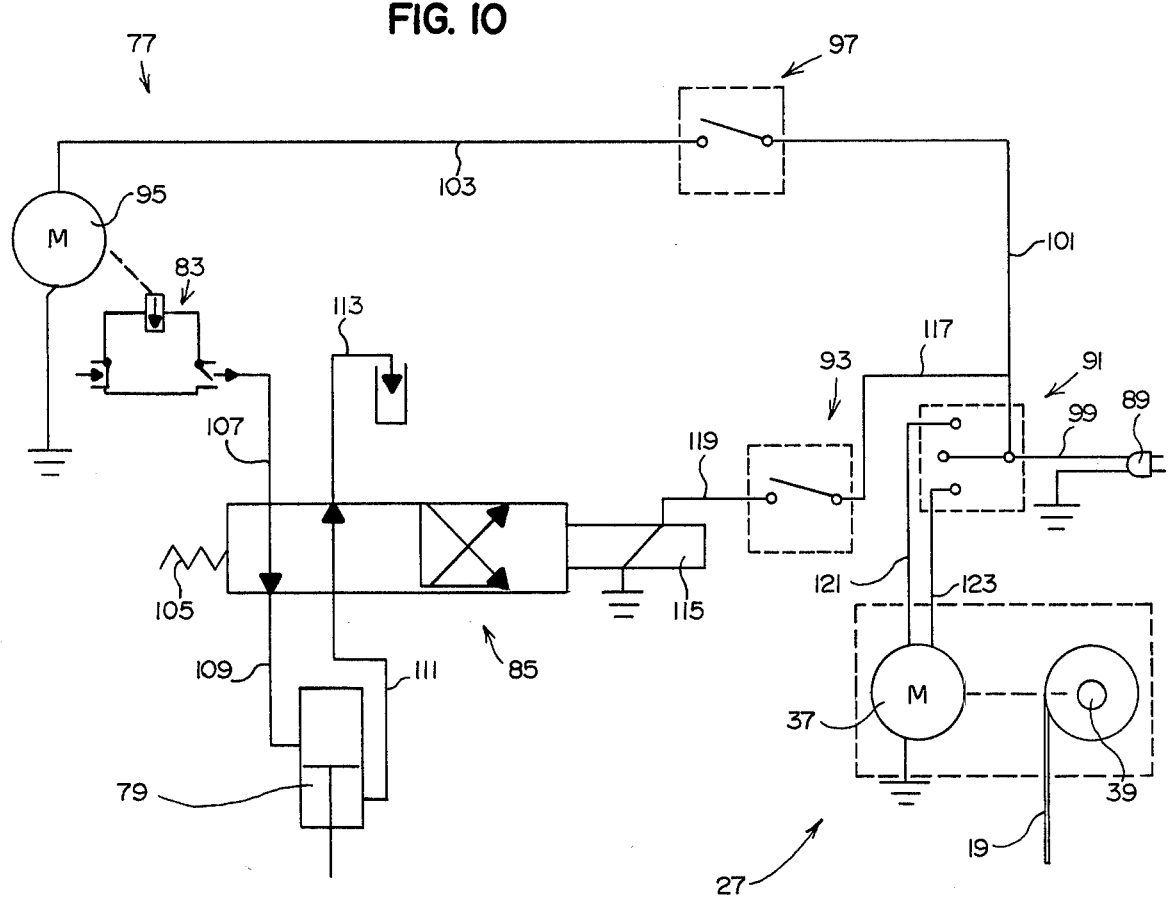
FIG. 10 is a simple schematic of the operative structure incorporated with the present invention.

Particular attention is now directed toward FIG. 10 of the drawings wherein it may be seen that the pneumatic actuator means 77 includes a typical pneumatic pump 83, and a typical solenoid actuated four-way valve 85. The apparatus 11 preferably is operated by electrical means as indicated by the electrical plug 89 which is intended to be electrically energized in any conventional fashion. The electric motor 37, being a reversible type, is operated by a single-pole double-throw switch 91 having a neutral position. The four-way solenoid actuated valve 85 is actuated by a single-pole single-throw switch 93 in a conventional fashion. Also, the pneumatic pump 83 is mechanically driven by an electric motor 95 which is energized by a single-pole single-throw switch 97.

More specifically, closing the switch 97 is effective in completing an electrical circuit between the power plug 89 and the motor 95, i.e., through a series of conductors 99, 101 and 103. Thus, the pneumatic pump 83 is energized when the switch 97 is closed. Placing the single-pole single-throw switch 93 in the open position as shown enables a compression spring 105 to urge the four-way valve 85 to the right as shown. Thus, the double-acting pneumatic cylinder 79 is extended to the position shown in FIGS. 2-4. A conduit 107 communicates the pump 83 with the valve 85 and a conduit 109 communicates the valve 85 with the pneumatic cylinder 79. Thus air pressure is communicated through the conduits 107 and 109 in extending the double acting pneumatic cylinder 79. Additionally, a conduit 111 communicates the back side of the double acting pneumatic cylinder 79 with the valve 85. Thus, this enables the air pressure to be discharged from the back side of the piston structure of the pneumatic cylinder 79 during the extending travel of the piston thereof.

Conversely, placing the single-pole single-throw switch 93 in the closed position energizes the solenoid 115 which overpowers the spring 105 and moves the valve 85 to the left for reversing the air pressure acting upon the double acting pneumatic cylinder 79. More specifically, the solenoid 115 is energized through a series of conductors 117, 119, i.e., the conductor 117 is tied to the conductor 101. Thus, air under pressure is communicated through the conduit 107 and crosses over through the valve 85 to the conduit 111 which retracts the double acting pneumatic cylinder 79 or moves the piston up as shown in FIG. 10. The return or air dump is now through the conduit 109, crossing over through the valve 85 to the conduit 113.

The winch means 27 is rotatably driven in one direction by moving the single-pole double throw switch 91 upwardly which energizes the motor 37 through the conductor 99 and a conductor 121. Conversely, the winch means 27 may be rotatably driven in an opposite direction by moving the single-pole double-throw switch 91 downwardly which energizes the motor 37 in a reverse direction through the conductor 99 and a conductor 123. Thus, the elongated flexible members 19, 21 may be extended or retracted to various positions as indicated in the sequential FIGS. 1-4 of the drawings, i.e., in establishing let-down cradles.

The operation of the lumber sorter which has the detachable sling letdown apparatus 11 of the present invention incorporated therewith is substantially identical to that disclosed in applicant's previously mentioned 3,776,379 patent. Therefore, the following is intended to merely teach the peculiarites of the operation of the detachable sling letdown apparatus 11 as sequentially depicted in FIGS. 1-4 of the drawings. The heights of the forward and rearward sling-like cradles 23, 25 are frequently adjusted simultaneously to minimize the falling distances as the lumber pieces L are received therein.

FIG. 1 depicts the hook means 41 in the normal or lumber loading position and the double acting hydraulic cylinder 79 is in the retracted position which constitutes the initial phase of operation. FIG. 2 depicts the second phase and shows the load of lumber pieces L being lowered to a conveyor apparatus 125 which is moving in the direction of an arrow 127, i.e., the lowering operation is effected by operating the electric winch means 27 which pays out the flexible members 19, 21. From FIG. 2 of the drawings it may also be seen that the double acting pneumatic cylinder 79 is extended which swings the hook means 41 to the couple/uncouple position thus allowing the sling-eye means 43 to gravitate or slip free from the hook means 41 in establishing the dangling ends 33, 35 as previously mentioned.

FIG. 3 of the drawings depicts the third phase of operation wherein elongated flexible members 19, 21 are taken up by the winch means 27 to the point where sling-eye means 43 engages the sling guide means 45. From FIG. 4 of the drawings it may be seen that further taking up action of the flexible members 19, 21 causes the boxlike member 49 to pivot about the pivot means 59 or swing upwardly to a substantially horizontal position. This presents the ring-like member 63 to the hook means 41 for interlocking engagement of the sling-eye means 43 and the hook means 41, i.e., since the hook means is in the couple/uncouple position as shown in FIG. 4 of the drawings, thus, constituting the fourth phase of operation.

The final sequence of operation returns the hook means 41 to the normal or depending position as shown in FIG. 1. It should be understood that the final sequential step preferably is achieved by simultaneously operating the single-pole double-throw switch 91 to the position which pays out the elongated flexible members 19, 21, and closing the single pole single-throw switch 93 which retracts the double acting pneumatic cylinder 79. In other words, as the hook means 41 swings downwardly to the normal position, it would be advantageous to simultaneously pay out at least a short length of the flexible member 19. Of course, the initial height of the cradle 23 for receving the lumber pieces L is determined by continued operation of the winch means 27 with the height of the cradle 23 being continuously variable as the load builds up, i.e., in the same manner as applicant disclosed in his previously mentioned 3,776,379 patent.

Although the invention has been described and illustrated with respect to a preferred embodiment, it should be understood that is is not to be so limited since changes and modifications may be made therein which are within the full intended scope of the invention.

I claim:

1. In a lumber sorter of the type having frame means defining a plurality of bays for receiving pieces of lumber, each of said bays being provided with at least a pair of elongated flexible members establishing cooperative forward and rearward slinglike cradles which support the lumber pieces as they are systematically dropped therein, and means for selectively controlling the height of said forward and rearward cradles, the improvement which comprises at least a pair of automatically operable coupler means for selectively coupling and uncoupling one of the respective ends of said pair of elongated flexible members with said frame means for enabling dangling ends thereof to readily be established thus facilitating disengagement from the lumber pieces.

2. The lumber sorter as set forth in claim 1 in which said means for selectively controlling the height of said forward and rearward slinglike cradles includes winch means having said pair of elongated flexible members fixedly attached thereto for selectively taking up and paying out said elongated flexible members; and in which each of said coupler means includes hook means swingably attached to said frame means for movement between a normal depending position and a substantially horizontal couple/uncouple position, and sling-eye means attached to said one of the ends of said elongated flexible members for cooperative engagement with said hook means.

3. The lumber sorter as set forth in claim 2 in which each of said coupler means includes sling-guide means swingably attached to said frame means and guidingly constraining said elongated flexible member for operatively engaging said sling-eye means as the take-up action of said elongated flexible member nears completion, said sling-guide means being urged to swing toward said hook means as a taut condition of said elongated flexible member develops with said sling-eye means being carried with said sling-guide means and being presented to said hook means for interlocking engagement of said sling-eye means and said hook means provided said hook means is in said couple/uncouple position.

4. The lumber sorter as set forth in claim 3 in which is included means for remotely moving said hook means between said normal depending position and said couple/uncouple position.

5. The lumber sorter as set forth in claim 4 in which said means for remotely moving said hook means between said normal and said couple/uncouple positions includes pneumatic actuator means.

6. The lumber sorter as set forth in claim 3 in which said sling-guide means includes an elongated boxlike member depending from an externally disposed sleevelike member, said boxlike member defining a normally substantial vertically disposed channel for readily passing said elongated flexible member therethrough, said channel being defined at least in part by a long wall and a confrontingly arranged relatively short wall, said sleevelike member being disposed adjacent the upper end of the exterior surface of said long wall and being fixedly attached thereto, said sleevelike member establishing in part pivot means pivotally attaching said boxlike member to said frame means for pivotal movement thereof about a horizontal axis, and said winch means and said pivot means being arranged with respect to one another to cause an angular non-straight pull on said boxlike member as said sling-eye means comes into engagement therewith, said angular non-straight pull being toward said relatively short wall thus enabling said elongated flexible member to engage and extend upwardly across the end of said relatively short wall as said boxlike member swings upwardly about the horizontal axis of said pivot means.

7. The lumber sorter as set forth in claim 6 in which is included means for remotely moving said hook means between said normal depending position and said couple/uncouple position.

8. The lumber sorter as set forth in claim 7 in which said means for remotely moving said hook means between said normal and said couple-uncouple positions includes pneumatic actuator means.

9. The lumber sorter as set forth in claim 2 in which said hook means includes a distal portion defining gullet means for restingly supporting said sling-eye means when said hook means is in said normal depending position, and camlike means for lockably receiving said sling-eye means within said gullet means when siad hook means is in said normal depending position and for providing means for readily enabling said sling-eye means to slidably gravitate free from said hook means as said hook means is moved to said couple/uncouple position.

* * * * *

Disclaimer 4,104,156.—*John K. Fletcher*, Hot Springs, Ark. DETACHABLE SLING LETDOWN APPARATUS FOR LUMBER SORTER. Patent dated Aug. 1, 1978. Disclaimer filed Nov. 4, 1980, by the assignee, *Harvey Engineering and Manufacturing Corporation.*

Hereby enters this disclaimer to claim 1 of said patent.

[*Official Gazette January 6, 1981.*]

REEXAMINATION CERTIFICATE (23rd)

United States Patent [19]
Fletcher

[11] B1 4,104,156
[45] Certificate Issued    Oct. 19, 1982

[54] DETACHABLE SLING LETDOWN APPARATUS FOR LUMBER SORTER

[75] Inventor: John K. Fletcher, Hot Springs, Ark.

[73] Assignee: Harvey Engineering & Manufacturing Corporation, Hot Springs, Ark.

Reexamination Request
No. 90/000,001, Jul. 1, 1981

Reexamination Certificate for:
Patent No.: 4,104,156
Issued: Aug. 1, 1978
Appl. No.: 805,901
Filed: Jun. 13, 1977

Disclaimer to claim 1 filed Oct. 15, 1980. (1002 O.G. 96)

[51] Int. Cl.³ .............................................. B65G 47/34
[52] U.S. Cl. ...................... 209/521; 209/933; 414/268
[58] Field of Search...209/517, 518, 519, 209/520, 209/521, 933; 414/98, 99, 100, 48, 49; 100/3; 294/74, 75, 76; 414/268

[56] References Cited

U.S. PATENT DOCUMENTS

| | | |
|---|---|---|
| 514,710 | 2/1894 | Gutenkunst. |
| 585,415 | 6/1897 | Waterhouse. |
| 643,558 | 2/1900 | Jallet. |
| 664,057 | 12/1900 | Olson. |
| 798,560 | 8/1905 | Von Bechtolsheim. |
| 964,250 | 7/1910 | Hanson. |
| 1,181,000 | 4/1916 | Gregg. |
| 1,221,693 | 4/1917 | Crosby. |
| 1,505,663 | 8/1924 | Oliver, et al. |
| 1,862,312 | 6/1932 | Kositzky. |
| 2,998,133 | 8/1961 | Rambo............................. 209/521 |
| 3,101,754 | 8/1963 | Stupfel. |
| 3,604,563 | 9/1971 | Ronan............................. 209/518 |
| 3,647,063 | 3/1972 | Rowley. |
| 3,696,948 | 10/1972 | Murdoch........................ 209/517 |
| 3,776,379 | 12/1973 | Harvey........................... 209/518 |
| 4,098,407 | 7/1978 | Moore. |

FOREIGN PATENT DOCUMENTS

| | | |
|---|---|---|
| 51684 | 11/1976 | Finland. |
| 315420 | 9/1969 | Sweden. |
| 347720 | 2/1972 | Sweden. |
| 367931 | 2/1974 | Sweden. |
| 476213 | 10/1975 | U.S.S.R. |

*Primary Examiner*—Allen N. Knowles

[57] ABSTRACT

Coupling apparatus for facilitating disengaging sling-like elongated flexible members from the load of lumber pieces being cradled therein. The apparatus includes a pair of hooks which are selectively driven between normal and couple/uncouple positions. A pair of sling-eyes are attached to one of the respective ends of the elongated flexible members and the sling-eyes are adapted for respective cooperative engagement and disengagement with the pair of hooks. Each flexible member passes through a sling-guide which operatively engages the sling-eye or presents it to the hook for recoupling as the flexible member is almost completely taken up by a winch. Subsequently, the hooks are moved to the normal position and the flexible members are sufficiently slackened for reloading.

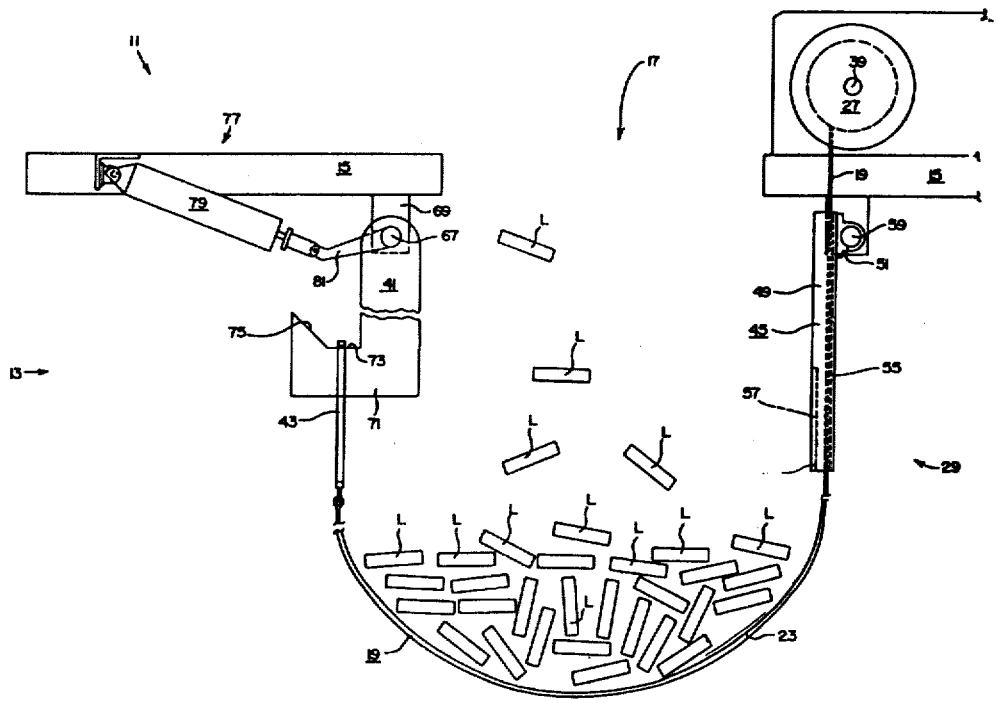

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, paragraph 3:

From FIG. 5 of the drawings it may be seen that the sling-eye means 43 includes a ring-like member 63 having a clevis member 65 fixedly attached thereto as by welding or the like, i.e., the ring-like member 63 and the clevis member 65 preferably are formed from steel or the like. The flexible elongated member 19 is suitably attached to the clevis member 65 in any well known manner so as to suitably support the weight of a load of lumber pieces L. The size of the clevis member 65 is such that it may be [received within] *drawn into* the channel 53 *by the flexible member 19 to index the orientation of such sling-eye means* as clearly shown in FIG. 5 of the drawings with sling-eye means 43 abuttingly engaging the lower end of the boxlike member 49 as best shown in FIGS. 3, 4 and 7 of the drawings.

AS A RESULT OF REEXAMINATION, IT HAS BEEN DETERMINED THAT:

Claim 1 was previously disclaimed.

Claims 2-12, having been finally determined to be unpatentable, are cancelled.

New claims 13-24 are added and determined to be patentable.

*13. In a lumber sorter of the type having frame means defining a plurality of bays for receiving pieces of lumber, each of said bays being provided with at least a pair of elongated flexible members defining cooperative forward and rearward open-topped slinglike cradles which support the lumber pieces as they are systematically dropped therein, and means for selectively controlling the height of said forward and rearward cradles and, at least, a pair of automatically operable coupler means for selectively coupling and uncoupling the respective dangling ends of said pair of elongated flexible members from said frame means for enabling said dangling ends thereof to readily be coupled to said frame means, the improvement comprising:*

*in each coupler means, single hook means carried pivotally from said frame means for rotation between a coupled position depending vertically downwardly from its pivot point and a coupling position projecting substantially horizontally from its pivot point, said coupler means, further, including eye means carried from the dangling end of the respective said flexible member for hooking directly to said hook means to cooperate with said hook means to act as the sole load bearing means for each coupler means of each such cradle.*

*14. The lumber sorter as set forth in claim 13 wherein:*

*said hook means of each coupler means are formed with a J-shape to define respective elongated shanks, each formed on one extremity with a pivot bore and on the opposite extremity with an out-turned gullet joined with a turned back cam surface and;*

*said sorter, further, includes pivot rod means projecting through said pivot bores and mounting said respective hook means to said frame means for pivoting in respective vertical planes from said coupling positions, with said shanks projecting horizontally from said pivot rod means and said gullets projecting substantially downwardly from said shank, to said coupled positions, with said shanks projecting substantially vertically downwardly from said pivot rod means with said gullets projecting horizontally therefrom and said cam surfaces projecting upwardly from said gullets.*

*15. The lumber sorter as set forth in claim 13 wherein:*

*each said coupler means includes guide means swingably attached to said frame means and formed with respective guide channels formed with open ended passageways having cross sections including index means; and*

*said eye means includes an index element for receipt in the respective open ends of said respective passageways for engaging said index means to hold said eye means oriented with the opening thereof facing in a predetermined direction for engaging said respective hook means when said hook means are in said coupling positions.*

*16. In a lumber sorter of the type having frame means defining a plurality of bays for receiving pieces of lumber, each of said bays being provided with at least a pair of elongated flexible members defining cooperative forward and rearward open-topped slinglike cradles which support the lumber pieces as they are systematically dropped therein, and means for selectively controlling the height of said forward and rearward cradles and, at least, a pair of automatically operable coupler means for selectively coupling and uncoupling the respective dangling ends of said pair of elongated flexible members from said frame means, the improvement comprising:*

*single first and second coupler elements forming each of said coupler means, said first element of each coupler means being carried pivotally from said frame means and second element being attached to said dangling end of said respective flexible member, said coupler means, further, including first means for moving said second element through a predetermined path and second means for rotating said first element selectively to a coupling position disposed in said predetermined path and also to a coupled position rotated from said coupling position whereby said second means may be actuated to rotate said first element to said coupling position and said first means may be actuated to move said second element through said predetermined path to engage said first element and said second means may be actuated to rotate said first element to said coupled position such that when said cradles are loaded said first element is maintained coupled with said second* element to cooperate therewith in serving as the sole load bearing elements of said respective coupler means.

17. The lumber sorter as set forth in claim 16 wherein:
said first element is in the form of a single rigid member.

18. The lumber sorter as set forth in claim 16 wherein:
said second means includes pivot means carried from said frame means and fixingly secured to said first element and, said second means further includes means for selectively rotating said pivot means.

19. The lumber sorter as set forth in claim 16 wherein:
said first coupler elements is in the form of an elongated hook means;
said second coupler elements is in the form of eye means.

20. The lumber sorter as set forth in claim 16 wherein:
one of said first and second coupler elements is in the form of a hook and the other of such first and second coupler elements is in the form of eye means engagable with said hook.

21. The lumber sorter as set forth in claim 16 wherein:
said first element is mounted and configured to be engaged by said second element when said second element is in a predetermined orientation, and said coupler means includes index means mounted on said second coupler element and an index element mounted on said first means and engagable with said index means as said first means moves said second element through said predetermined path and approaches the coupler position of said first element to maintain said second element in said predetermined orientation as it engages said first coupler element.

22. The lumber sorter as set forth in claim 16 wherein:
said first element is mounted on said frame means to rotate in a predetermined plane as it rotates from said coupling position to said coupled position and said first means includes guide means swingably attached to said frame means for swinging in said predetermined plane, to carry said second coupler element through said predetermined path, said guide means being formed with a guide channel formed with an open ended passage for passage therethrough of said respective flexible member.

23. The lumber sorter as set forth in claim 16 wherein:
said first coupler element is mounted from said frame means for rotation about a single axis of rotation.

24. Lumber sorter apparatus comprising;
frame means defining a plurality of bays for receiving pieces of lumber, each of said bays being provided with at least a pair of elongated flexible members establishing cooperative forward and rearward open-topped slinglike cradles which support the lumber pieces as they are systematically dropped therein, said flexible members being free on their respective one ends to form dangling ends and also being formed with respective second ends;
winch means mounted on said frame means and having said respective second ends fixedly attached thereto for selectively paying out and taking up said flexible members;
at least a pair of automatic coupler means for selectively coupling said one ends of said flexible members and including sling-eye means fixed to one ends and coupler hooks pivotally mounted on said frames and rotatable from a depending position to a substantially horizontal coupler/uncoupler position, each hook being formed with a distal portion defining a gullet means for restingly supporting said respective sling-eye means when said hooks are in said depending positions, each said hook further including cam means configured to lockably retain said sling-eye means in said gullets when said hooks are in a said depending position and to enable said eye means to gravitate free from said respective hooks as said hooks are rotated to said coupler/uncoupler positions.

* * * * *